United States Patent
Hartl et al.

(10) Patent No.: US 10,684,102 B2
(45) Date of Patent: Jun. 16, 2020

(54) METHOD FOR PRODUCING A RING-SHAPED OR PLATE-LIKE ELEMENT

(71) Applicant: Schott AG, Mainz (DE)

(72) Inventors: Helmut Hartl, Vienna (AT); Thomas Pfeiffer, Kumhausen (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/498,984

(22) Filed: Apr. 27, 2017

(65) Prior Publication Data

US 2017/0227337 A1    Aug. 10, 2017

Related U.S. Application Data

(63) Continuation-in-part of application No. 14/835,064, filed on Aug. 25, 2015, now Pat. No. 9,651,345, (Continued)

(30) Foreign Application Priority Data

Sep. 17, 2010  (DE) ........................ 10 2010 045 641

(51) Int. Cl.
*F42B 3/103*  (2006.01)
*B21K 21/08*  (2006.01)
(Continued)

(52) U.S. Cl.
CPC .............. *F42B 3/103* (2013.01); *B21J 1/025* (2013.01); *B21K 1/761* (2013.01); *B21K 21/08* (2013.01);
(Continued)

(58) Field of Classification Search
CPC ......... B23P 15/00; B21K 1/761; B21K 21/00; B21K 21/02; B21K 21/08; B21K 51/10;
(Continued)

(56) References Cited

U.S. PATENT DOCUMENTS 1,325,194 A    12/1919  Geist
1,584,998 A    5/1926   Symons et al.
(Continued)

FOREIGN PATENT DOCUMENTS

CA    2 459 262 A1    9/2004
CN    1064964 A       9/1992
(Continued)

OTHER PUBLICATIONS

Communication dated Aug. 6, 2010 from European Patent Office for EP 10 002 045.2-1260, including European Search Report dated Jul. 30, 2010 and opinion (7 pages).
(Continued)

*Primary Examiner* — Christopher M Koehler
(74) *Attorney, Agent, or Firm* — Taylor IP, P.C.

(57) ABSTRACT

The invention relates to a method for producing a ring-shaped or plate-like element, in particular for a metal-sealing material-feedthrough, in particular for devices which are subjected to high pressures, for example igniters for airbags or belt tensioning devices, whereby a blank, especially in the embodiment of a wire-shaped material is provided and the blank is subjected to processing so that a feedthrough-opening can be incorporated into a ring-shaped or plate-like element created from the blank.

17 Claims, 5 Drawing Sheets

Related U.S. Application Data which is a continuation of application No. 13/234,687, filed on Sep. 16, 2011, now Pat. No. 9,423,218.

(51) Int. Cl.
  *B21J 1/02* (2006.01)
  *B21K 1/76* (2006.01)
  *B23P 15/00* (2006.01)
  *B60R 21/26* (2011.01)

(52) U.S. Cl.
  CPC ..... *B23P 15/00* (2013.01); *B60R 2021/26029* (2013.01); *Y10T 29/49908* (2015.01)

(58) Field of Classification Search
  CPC ........ B21K 53/24; B21K 53/20; B21K 53/16; Y10T 29/49908
  USPC ......... 29/417, 557, 558; 72/324, 367.1, 368, 72/370.1, 333, 334, 335, 341, 352, 356, 72/358; 102/202.5, 202.9, 202.14, 202.7
  See application file for complete search history.

(56) References Cited

U.S. PATENT DOCUMENTS

| | | | |
|---|---|---|---|
| 1,813,906 A | 6/1928 | Caron | |
| 1,990,718 A * | 2/1935 | Swanstrom | B21D 53/24 |
| | | | 29/417 |
| 3,134,329 A | 5/1964 | Zeman | |
| 3,274,937 A | 9/1966 | Kyle | |
| 3,635,067 A | 1/1972 | Hanas | |
| 3,735,664 A | 5/1973 | Hermle | |
| 3,735,705 A | 5/1973 | Hudson, Jr. et al. | |
| 3,854,827 A | 12/1974 | Merz et al. | |
| 3,901,772 A | 8/1975 | Guillotin et al. | |
| 3,971,320 A | 7/1976 | Lee | |
| 4,048,835 A | 9/1977 | Giger | |
| 4,453,033 A | 6/1984 | Duff et al. | |
| 4,566,892 A | 1/1986 | Ertel | |
| 4,577,646 A | 3/1986 | Ziehn | |
| 4,580,431 A * | 4/1986 | Oku | B21K 1/30 |
| | | | 72/334 |
| 4,686,903 A | 8/1987 | Wittwer | |
| 4,800,745 A | 1/1989 | Yokoyama | |
| 5,016,461 A | 5/1991 | Walker et al. | |
| 5,140,906 A | 8/1992 | Little, II | |
| 5,157,831 A | 10/1992 | Wang et al. | |
| 5,243,492 A * | 9/1993 | Marquit | F42B 3/11 |
| | | | 102/202.9 |
| 5,321,307 A | 6/1994 | Murai | |
| 5,345,872 A | 9/1994 | Takahashi et al. | |
| 5,367,125 A | 11/1994 | Viret et al. | |
| 5,404,263 A | 4/1995 | Graves et al. | |
| 5,538,527 A | 7/1996 | Viret et al. | |
| 5,557,074 A | 9/1996 | Miyamoto et al. | |
| 5,618,237 A * | 4/1997 | Shinjo | B21D 53/24 |
| | | | 470/91 |
| 5,621,183 A | 4/1997 | Bailey | |
| 5,672,841 A | 9/1997 | Monk et al. | |
| 5,709,724 A * | 1/1998 | Naugler | C03C 27/02 |
| | | | 65/59.4 |
| 5,732,634 A | 3/1998 | Flickinger et al. | |
| 5,894,752 A * | 4/1999 | Yano | B21C 23/18 |
| | | | 72/355.2 |
| 5,932,832 A | 8/1999 | Hansen et al. | |
| 5,943,897 A | 8/1999 | Tsue et al. | |
| 5,988,069 A | 11/1999 | Bailey | |
| 6,026,721 A | 2/2000 | Fukai | |
| 6,274,252 B1 * | 8/2001 | Naugler | C03C 27/02 |
| | | | 174/152 GM |
| D460,684 S | 7/2002 | Liao | |
| 6,557,474 B1 | 5/2003 | Morte et al. | |
| 6,612,241 B2 | 9/2003 | Avetisian | |
| 6,755,670 B2 | 6/2004 | Korber | |
| 6,877,431 B2 | 4/2005 | Heeke | |
| 6,936,303 B1 | 8/2005 | Katsuda et al. | |
| D528,407 S | 9/2006 | Schwab | |
| 7,124,688 B2 | 10/2006 | Avetisian et al. | |
| 7,267,056 B2 | 9/2007 | Takahara et al. | |
| 7,770,520 B2 | 8/2010 | Fink et al. | |
| 7,823,289 B2 * | 11/2010 | Willers | B21C 23/142 |
| | | | 29/412 |
| 7,975,611 B2 | 7/2011 | Bjoern | |
| 8,127,681 B2 | 3/2012 | Fink | |
| 2002/0069781 A1 | 6/2002 | Avetisian et al. | |
| 2002/0069783 A1 | 6/2002 | Avetisian et al. | |
| 2002/0081899 A1 | 6/2002 | Korber | |
| 2002/0174792 A1 | 11/2002 | Kubozuka et al. | |
| 2003/0087705 A1 * | 5/2003 | Matsuyama | B21K 1/64 |
| | | | 470/26 |
| 2003/0177936 A1 | 9/2003 | Luebbers | |
| 2003/0192446 A1 | 10/2003 | Berg et al. | |
| 2003/0196468 A1 * | 10/2003 | Ando | B21C 23/20 |
| | | | 72/353.2 |
| 2004/0020052 A1 * | 2/2004 | Haga | B21K 1/00 |
| | | | 29/898.054 |
| 2004/0079545 A1 | 4/2004 | Heeke | |
| 2004/0216631 A1 * | 11/2004 | Fink | F42B 3/103 |
| | | | 102/200 |
| 2004/0250542 A1 | 12/2004 | Nishina | |
| 2005/0051435 A1 | 3/2005 | Forster et al. | |
| 2005/0126415 A1 | 6/2005 | Takahara et al. | |
| 2005/0166381 A1 * | 8/2005 | Babej | B21D 53/24 |
| | | | 29/417 |
| 2006/0053612 A1 * | 3/2006 | Babej | B21D 53/24 |
| | | | 29/412 |
| 2006/0207469 A1 | 9/2006 | Fink et al. | |
| 2006/0222881 A1 | 10/2006 | Fink et al. | |
| 2007/0187934 A1 | 8/2007 | Fink | |
| 2008/0245545 A1 | 10/2008 | Bjorn | |
| 2008/0250963 A1 * | 10/2008 | Fink | F42B 3/103 |
| | | | 102/202.8 |
| 2009/0044715 A1 | 2/2009 | Hartl et al. | |
| 2009/0158953 A1 | 6/2009 | Magne et al. | |
| 2009/0282952 A1 * | 11/2009 | Yen | B21K 5/00 |
| | | | 81/124.6 |
| 2010/0199872 A1 | 8/2010 | Fink et al. | |
| 2010/0229616 A1 * | 9/2010 | Fink | F42B 3/103 |
| | | | 72/338 |
| 2012/0067099 A1 | 3/2012 | Hartl et al. | |
| 2012/0199036 A1 | 8/2012 | Fink | |

FOREIGN PATENT DOCUMENTS

| | | |
|---|---|---|
| CN | 2808662 Y | 8/2006 |
| CN | 101417379 A | 4/2009 |
| CN | 100393555 C | 6/2011 |
| DE | 2904174 A1 | 8/1980 |
| DE | 34 14 625 | 10/1984 |
| DE | 34 15 625 A1 | 10/1985 |
| DE | 198 35 478 A1 | 2/2000 |
| DE | 199 27 233 | 1/2001 |
| DE | 101 33 223 | 10/2002 |
| DE | 103 48 944 | 5/2004 |
| DE | 203 14 580 | 9/2004 |
| DE | 103 26 253 B3 | 11/2004 |
| DE | 10 2005 009 644 A1 | 9/2006 |
| DE | 10 2006 004 036 A1 | 8/2007 |
| DE | 10 2007 016 692 B3 | 7/2008 |
| DE | 10 2010 045 641 A1 | 3/2012 |
| EP | 0 064 263 A2 | 4/1982 |
| EP | 0 137 488 A2 | 4/1985 |
| EP | 0 064 263 B1 | 7/1986 |
| EP | 0 248 977 A1 | 12/1987 |
| EP | 0 248 977 B1 | 1/1992 |
| EP | 0 610 925 A1 | 8/1994 |
| EP | 1 061 325 A1 | 12/2000 |
| EP | 1 130 697 A2 | 9/2001 |
| EP | 1 225 415 | 7/2002 |
| EP | 1 061 325 B1 | 1/2003 |
| EP | 1 455 160 A1 | 9/2004 |
| EP | 1 491 848 | 12/2004 |

(56) References Cited

FOREIGN PATENT DOCUMENTS

| | | |
|---|---|---|
| EP | 1 808 667 A2 | 7/2007 |
| EP | 1 813 906 A1 | 8/2007 |
| EP | 1 855 018 A2 | 11/2007 |
| EP | 1 455 160 B1 | 5/2008 |
| EP | 2 187 162 A2 | 5/2010 |
| EP | 2 251 633 A2 | 11/2010 |
| EP | 2 270 417 A2 | 1/2011 |
| EP | 1 813 906 B1 | 4/2011 |
| JP | 60-105829 A | 6/1985 |
| JP | 3-5753 U | 1/1991 |
| JP | 5-256596 A | 10/1993 |
| JP | 3058511 U | 3/1999 |
| JP | 2000-500856 A | 1/2000 |
| JP | 2000-111297 A | 4/2000 |
| JP | 2001-518439 A | 10/2001 |
| JP | 2003-285712 A | 10/2003 |
| WO | 99/16721 A1 | 4/1999 |
| WO | 03/083404 A1 | 10/2003 |
| WO | 2007/054530 A1 | 5/2007 |

OTHER PUBLICATIONS

Communication dated Jun. 1, 2011 from European Patent Office for EP 10 002 045.2-1260 (4 pages).
Communication dated Oct. 17, 2011 from European Patent Office for EP 10 009 062.0-1260, including European Search Report dated Oct. 6, 2011 and opinion (8 pages).
Communication dated Oct. 17, 2011 from European Patent Office for EP 10 009 095.0-1260, including European Search Report dated Oct. 7, 2011 and opinion (8 pages).
Opposition documents dated Feb. 3, 2009 filed in European Patent Office in EP 1 455 160 B1, including documents E5-E13 (52 pages).
Communication dated Jun. 11, 2004 from European Patent Office for EP 04002670.0-1260, including European Search Report dated May 21, 2004 (4 pages).
Communication dated Jun. 8, 2005 from European Patent Office for EP 04002670.0-1260 (10 pages).
Communication dated Jul. 24, 2009 submitted in EP 04002670.0, including document E14 (10 pages).
Communication dated Oct. 28, 2009 submitted in EP 04002670.0, including documents E6.1-E7.1 (12 pages).
Communication dated Oct. 12, 2010 from European Patent Office in EP 04002670.0 (3 pages).
Document dated Jan. 26, 2009 and signed by Sabine Sibera (4 pages).
Communication dated Jan. 21, 2011 submitted in EP 04002670.0, including documents E14-E25 (33 pages).
Communication dated Oct. 7, 2011 from European Patent Office in EP 04002670.0 (2 pages).
Communication dated Mar. 2, 2011 from European Patent Office in EP 04002670.0 (1 page).
Transcript in opposition in EP 04002670.0 (EP 1455160)(41 pages).
Documents filed Jun. 30, 2011 in European Patent Office in EP 04 002 670.0-1260 (28 pages).
Declaration of Mr. Thomas Fink dated May 9, 2011 submitted in U.S. Appl. No. 12/098,616 (2 pages).
Declaration of Mr. Thomas Fink dated Sep. 19, 2011 submitted in U.S. Appl. No. 12/788,624 (4 pages).
Declaration of Mr. Thomas Fink dated May 2, 2011 submitted in U.S. Appl. No. 12/098,616 (4 pages).
Declaration of Dr. Michael Sawodny dated Feb. 28, 2011 in U.S. Appl. No. 11/627,173, with Appendixes A-F (88 pages).
Declaration of Dr. Michael Sawodny dated Mar. 21, 2011 in U.S. Appl. No. 11/627,173, with Corrected Appendix E (9 pages).
Declaration of Mr. Thomas Fink dated Feb. 28, 2011 in U.S. Appl. No. 11/627,173, with Appendixes A-B (7 pages).
Documents filed in appeal in European Patent Office on Oct. 25, 2011 for EP 1 455 160 (Application No. EP 04002670.0)(166 pages).
Documents filed in opposition in European Patent Office on Jan. 19, 2012 (appears to have filed only in part on Jan. 18, 2012) for European Patent No. EP 1 813 906 (168 pages).
Communication from Japanese Patent Office (dated Jan. 16, 2012) in Japanese Patent Application No. 2009-270630 (3 pages).
Communication dated Oct. 17, 2011 from European Patent Office for European Patent Application No. EP 10 00 9062, including European Search Report (dated Oct. 6, 2011) and Written Opinion (8 pages).
Communication dated May 21, 2007 from European Patent Office including European Search Report (dated May 10, 2007) and European Search Opinion for European patent application No. EP 06 021 694.2 (7 pages).
Communication dated Aug. 12, 2009 from European Patent Office for European patent application No. EP 06 021 694.2 (5 pages).
Communication dated Dec. 1, 2010 from European Patent Office for European patent application No. EP 06 021 694.2 (8 pages).
Communication dated Dec. 17, 2010 from European Patent Office for European patent application No. EP 06 021 694.2 (50 pages).
Letter dated Mar. 4, 2011 from Dr. Michael Sawodny to European Patent Office, including corrected English translation of claims, for European patent application No. EP 06 021 694.2 (8 pages).
EP 2 187 162 A3 including European Search Report dated Jul. 30, 2010 for European Patent Application No. EP 10 00 2045 (4 pages).
Communication dated Jul. 28, 2010 from European Patent Office for European patent application No. EP 06 021 694.2 (5 pages).
Communications dated Oct. 18, 2010 and Oct. 29, 2010 from European Patent Office for European patent application No. EP 06 021 694.2 (2 pages).
Gestaltungsregein für Stanzteile aus Stahl; DIN 6932; Jan. 1983; pp. 61-65 (5 pages).
Begriffe der Stanztechnik Fertigungsverfahren und Werkzeuge zum Zerteilen; DIN 9870; Oct. 1972; pp. 306-307 and 300-302 (6 pages).
Chinese Search Report dated Jan. 6, 2015 for Chinese Application No. 201110285207.4 (3 pages).

\* cited by examiner

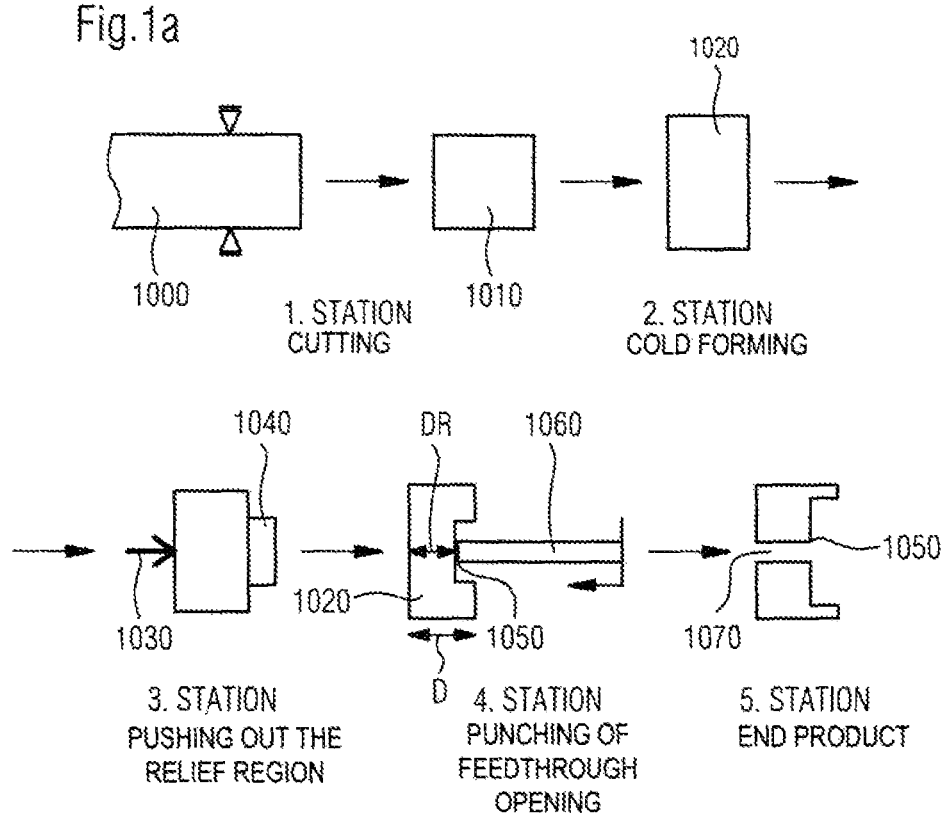
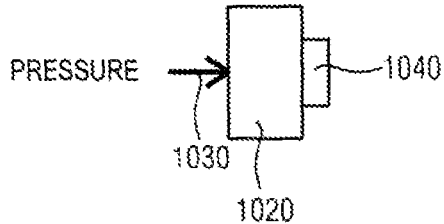
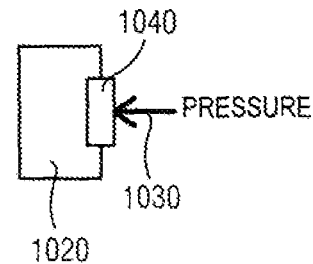

METHOD FOR PRODUCING A RING-SHAPED OR PLATE-LIKE ELEMENT

CROSS REFERENCE TO RELATED APPLICATIONS

This is a continuation-in-part of U.S. patent application Ser. No. 14/835,064, entitled "METHOD FOR PRODUCING A RING-SHAPED OR PLATE-LIKE ELEMENT", filed Aug. 25, 2015, which is a continuation of U.S. patent application Ser. No. 13/234,687, entitled "METHOD FOR PRODUCING A RING-SHAPED OR PLATE-LIKE ELEMENT", filed Sep. 16, 2011, now U.S. Pat. No. 9,423,218, both applications are incorporated herein by reference.

BACKGROUND OF THE INVENTION

1. Field of the Invention

The invention relates to a method for producing a ring-shaped or plate-like element, in particular for a metal-sealing material-feedthrough, in particular for devices which are subjected to high pressures, for example igniters for airbags or belt tensioning devices, as well as a method to produce a metal-sealing material-feedthrough.

2. Description of the Related Art

Metal-sealing material-feedthroughs are already known in various forms from the current state of the art. Metal-sealing material-feedthroughs are to be understood to be vacuum-tight fusions of sealing materials, especially glasses, glass ceramics or synthetics in metals. The metals function hereby as conductors. We refer you in this context to representative documentation U.S. Pat. Nos. 5,345,872, 3,274,937. Feedthroughs of this type are common in electronic and electrical engineering. The material used for sealing, especially glass serves as an insulator. Typical metal-sealing material-feedthroughs are constructed such that metallic internal conductors are sealed into a pre-formed sintered glass component, whereby the sintered glass component or the glass tube is sealed into an outer metal component with the so-called base body which is formed by a ring-shaped or plate-like element. Preferred applications for metal-sealing material-feedthroughs of this type are for example ignition devices. One area of application is in air bags or belt tensioning devices in motor vehicles. In this case the metal-sealing material-feedthroughs are a component part of an ignition device. The entire ignition device includes in addition to the metal-sealing material-feedthrough an ignition bridge, the explosive agent as well as a metal shrouding which tightly encloses the ignition mechanism. Either one or two, or more than two metal pins may be inserted through the feedthrough. In another embodiment with one metallic pin the housing is grounded; in a two-pin embodiment one of the pins is grounded.

Metal-sealing material-feedthroughs, especially for igniters for airbags or belt tensioning devices which distinguish themselves in that the feedthrough opening for the metal pins is punched out of the base body have become known from US 2006/0222881 A1, US 2004/0216631, EP-A-1 455 160, US 2007/0187934 A2 and U.S. Pat. No. 1,813,906. During the production of the base bodies from a strip stock having a thickness in the range of between 1 mm and 5 mm, for example 1.5 mm and 3.5 mm, especially between 1.8 mm to 3.0 mm, more especially for example between 2.0 mm to 2.6 mm the openings are punched through the entire thickness of base body D by means of a punching process, according to US 2007/0187934.

The metal pin in the sealing material is embedded into the opening punched into the base body across the entire thickness D of the base body which is in the aforementioned range.

Moreover, the feedthrough-opening in feedthroughs with more than one pin is arranged off-center according to US 2007/0187934 A1.

According to US 2007/0187934 A1 punching sheet metal has a multitude of disadvantages. One disadvantage is that when punching a solid material, for example sheet metal of the base body, a great amount of material waste occurs.

Especially in metal-sealing material-feedthroughs with two metal pins and an off-center opening the problem arose that the off-center opening resulted in a weakening of the glazing.

It is therefore the objective of the current invention, and what is needed in the art is, to avoid the described disadvantages according to the current state of the art and to cite a method in particular for the production of a base body in the form of a ring-shaped or plate-like element for a metal-sealing material-feedthrough which can be produced with lesser material waste than is the case in the current state of the art, in particular in a cold forming process.

SUMMARY OF THE INVENTION

According to the current invention the objective is met by, and the present invention provides, a method for the production of a plate-like element which represents the base body, in particular for a metal-sealing material-feedthrough, whereby a blank, especially a wire-shaped material, is provided and the blank is subjected to processing so that a feedthrough-opening can be incorporated into a ring-shaped or plate-like element created from the blank. This ring-shaped or plate-like element is also referred to as base body.

The processing of the blank may include incorporation of a relief region and reshaping, especially cold-forming. According to various publications such as EP 1 855 018 A2, the content of which is enclosed in this application in its entirety a relief region is always characterized in that the relief region has a diameter greater than the diameter of a feedthrough opening adjacent to said relief region. In this application a relief region is in accordance with EP 1 855 018 A2 characterized in that said diameter of said relief region is greater than the diameter of said feedthrough opening. This is advantageous in order to allow the stamping of the feedthrough opening through a cold formed base body, especially a cold formed base body with a bigger thickness, in order to produce such base body with a good efficiency in an industrial mass production method.

The following design rules may be applied in order to secure the good efficiency: The diameter DRE of the relief region is larger than the diameter DFT of the feedthrough opening. Also, for example, the thickness DR of the feedthrough, i.e. the length and or the height of the feedthrough opening, is at maximum 1.5 times larger than the diameter DFT of the feedthrough opening. Those design rules enable and/or at least improve the stamping of the feedthrough opening especially through a cold formed base body and/or a base body made from a hard material like stainless steels. For example, the diameter of the relief region is 1.1 times to 5 times, for example 1.1 to 2 times greater than the diameter of the feedthrough opening. The tool life of the punching tools such as a stance needle, which is used to punch and/or stamp the feedthrough opening through the reduced thickness of the ring-shaped or plate like element, might also be enhanced.

Another optional advantageous parallel design rule refers to the diameter DRE of the relief region. This diameter DRE can be chosen to provide a sufficient length DW of the wall of the base body surrounding the relief region. The relief region is as described herein advantageously located in the center of the ring-shaped or plate like element. Hence, if DOV is the overall diameter of the ring-shaped or plate like element, the diameter DRE of the relief region is the difference between the overall diameter and two times the length of the wall DW. DW is chosen to provide enough length for fixing a functional element to the ring-shaped or plate like element, such as ground pin. Such ground pin might be soldered to the ring-shaped or plate like element. The solder area is usually larger than the diameter of the ground pin. In order to provide a reliable processing window the invention as described herein also includes the design rule that the length DW of the wall is at least 1.5 times the diameter of the ground pin.

In the industrial application of the invention as described herein, the specification for producing a ring-shaped or plate like element defines the overall diameter DOV and the entire thickness D as start parameters. The diameter DGP of the ground pin usually is a constant as well as the diameter of the pin located in the feedthrough opening. The aforesaid design rules can be summarized by the following relations:

$$DR \leq 1.5 \times DFT$$

$$DRE > DFT$$

$$DRE \leq DOV - 2 \times (DGP + \tfrac{1}{2}DGP)$$

The height HF of the relief region is of course the difference between the specified overall thickness D and the thickness DR of the feedthrough opening.

The process steps of the method can be carried out in varying sequence.

One possible sequence without limitation thereto includes the following process steps:

A blank, in particular of a wire-shaped material, is provided.

The blank is cold-formed, in particular by means of compressing, whereby the relatively geometric dimensions are changed, resulting in the plate-like element with an essentially round outside contour.

A relief region is incorporated into the plate-like element.

After incorporation of the relief region in the plate-like element—which results in that the plate-like element has a lesser thickness in the region of the through-opening than the thickness of the plate-like element, especially the base body—the through-opening is produced in the region of reduced thickness with the assistance of a punching process. By choosing the diameter of the relief region greater than the diameter of feedthrough opening a punching tool could be used, e.g. a stance needle. Furthermore, its lifetime can be enhanced significantly by application of the teaching of this invention. The risk of a breakage of the stance needle can be significantly reduced.

The diameter of the relief region is advantageously 1.1 times to 5 times greater than the diameter of the feedthrough opening. In case the ground pin as well as the pin within the feedthrough opening have a diameter DGP of 1 mm, the aforementioned design rules lead to the following parameters:

The diameter DFT of the feedthrough opening is for example at least 2 mm, in this example 2 mm. Then the thickness and/or length DR of the feedthrough opening is at maximum 3 mm. The length of the wall DW as mounting area for the ground pin is at minimum 1.5 mm. If the overall diameter DOV of ring-shaped or plate like element is specified to be 7 mm, then the diameter of the relief region is at maximum 7 mm−2×1.5 mm=4 mm.

If the entire thickness of the ring-shaped or plate like element is specified to be 4.4 mm, the height HF of the relief region is HF=4.4 mm−3 mm=1.4 mm.

The relief region is always a material-free part of the ring-shaped or plate-like element. The feedthrough opening is produced by stamping with a punching tool, e.g. a stance needle from the side of the relief region, i.e. the punching tool, e.g. the stance needle is inserted in the relief region. After insertion in the relief region the feedthrough opening is stamped and/or punched from the relief regions side. By punching and/or stamping a feedthrough opening is introduced in the ring-shaped or plate like element preferably having a reduced thickness DR which lies for example between 1.5 mm and 3 mm.

The relief region itself is advantageously produced by a stamping or forming tool having a diameter which corresponds to the diameter DRE of the relief region. The greater the value of the quotient between the diameter DRE of the relief region to the height HF of the relief region, the more robust is this forming tool. Therefore another design rule is implied which tends to maximize the diameter DRE of the relief region up to the limit of the required length or thickness DW of the wall surrounding the relief region.

In a first embodiment of the method a relief region may be incorporated into the blank or the ring- or plate like element, or respectively the base body in that the blank or the ring- or plate like element is pressed against a punch. Due to the pressure of the punch the material of the blank or the ring-shaped or plate-like element which is for example steel with a copper component of 1 to 5 weight-% copper surrounds around the punch. In this manner a relief bore or respectively a relief region can be incorporated into the blank or the ring-shaped or plate-like element by means of the punch. Alternatively, it is possible not to press the blank or the ring-shaped or plate-like element against a punch, but instead press a punch against one side of the blank or the ring-shaped or plate-like element. Due to the pressure this results in that the material of the plate-like body is pushed out on the side opposite the side on which the pressure is exerted. The result of this process is again the production of a relief region, or respectively the relief bore.

After providing the relief region a punching tool is provided in the area of the relief region or respectively the relief bore and the feedthrough-opening is produced by means of punching. The thickness of the ring-shaped or plate-like element can be reduced in the region of the through-opening which is to be punched, for example to values from 1.5 mm to 4.5 mm.

It is preferred if a conically tapering opening is punched out with the assistance of the punching tool.

The advantage of the illustrated method is that the production of the ring-shaped or plate-like element which finds use in a metal-sealing material-feedthrough occurs essentially at the same time interval in all different process steps. This means that the step of cold-forming, the step of incorporating the relief opening or respectively the relief region, as well as the step of punching the through-opening into the ring-shaped or plate-like element requires essentially the same amount of time. In this manner it is possible—starting with a wire like material—to produce a ring-shaped or plate-like element with a through-opening essentially at the same pace at different work stations, that is the work station for cold forming, the work station for producing the relief opening and the work station for punching. If it is necessary, like for example in the current state of the art to produce the bore in a machined or cold formed ring-shaped or plate-like element not by means of a punching process but by means of a drilling process, then the drilling process requires a much longer time than cold forming. Thus, the production of a ring-shaped or plate-like element requires at least double the time, compared to the inventive method.

As stated previously it is preferred, if the plate-like element consists of steel, for example high grade steel with a copper content in the range of 1 weight % to 5 weight %, especially between 2.0 weight % to 4 weight %. A material of this type allows for the ring-shaped or plate-like element, or respectively the base body to be produced through cold forming, for example from a wire material. Hereby a piece is initially cut off the steel wire with the above stated copper content. In an additional step it is brought into the desired shape by means of compression into the form of the plate-like element. This is only possible if the material possesses a certain elasticity which is achieved through the stated copper content. The material is heavily compressed or respectively compacted through the described cold forming.

However, the material does not have to be formable only through cold forming, but in applications for example for airbag igniters it must also possess sufficient rigidity in order to absorb ejection forces of 1750 N to 3000 N which act upon the sealing material without deformation when using in an igniter. In addition the material must also guarantee reliable laser welding.

Surprisingly it has been found that a steel, in particular a high grade steel with a copper content of 1 weight % to 5 weight % combines these two conflicting characteristics, namely on the one hand the sufficient elasticity for cold-forming and on the other hand sufficient rigidity, or respectively flexural strength in order to withstand the high extraction forces or respectively the high ejection force under load, as can occur in a metal-sealing material-feedthrough in an igniter.

The previously described ejection force which is characteristic for metal-sealing material-feedthroughs is that force which must be applied in order to eject the sealing material which is placed in the opening of the metal sealing material feedthrough. The level of the ejection force may be determined either hydrostatically or mechanically. If the ejection force is determined mechanically then the surface of the sealing material is acted upon with a punch whereby the surface of the punch which presses upon the sealing material is smaller than the surface of the sealing material.

Alternatively, the ejection force may be measured hydrostatically. In this case the sealing material is acted upon with a hydrostatic pressure, for example water pressure and is then measured, whereby the sealing material is expelled from the feedthrough opening by said hydrostatic pressure.

In addition to the inventive method for the production of a ring-shaped or plate-like element, the invention also provides a method to produce a metal-sealing material-feedthrough with such a ring-shaped or plate-like element being the base body, whereby the metal pin of the metal-sealing material-feedthrough is glazed into the feedthrough opening of the ring-shaped or plate-like element with the assistance of the sealing material.

First, the ring-shaped or plate-like element is produced with the inventive method. Subsequently, a metal pin is fused into a sealing material which may for example be a glass plug. Then, the glass plug is placed together with the metal pin into the feedthrough opening. Glass and metal ring, in this case the ring-shaped or plate-like element are heated, so that after cooling the metal shrinks onto the sealing material—in this case the glass plug.

A method for the production of a metal-sealing material-feedthrough is cited whereby two metal pins are provided. Since, according to the invention, the feedthrough opening in the plate-like element is located essentially in the center, both metal pins are curved. While one of the metal pins is passed through the feedthrough opening insulated in the glass plug, the other metal pin can be in the embodiment of a grounded pin and is conductively connected with the base body, for example through brazing.

The inventively produced metal-sealing material-feedthrough is advantageously applied in ignition devices of any desired design. For example, an ignition device of this type can be provided for a pyrotechnic protective device, especially for an airbag or a belt tensioning device. A pyrotechnic protective device of this type includes a metal-sealing material-feedthrough produced in accordance with the current invention, as well as a cap connected with the base body of said metal-sealing material-feedthrough, whereby a propellant is encased between the metal-sealing material-feedthrough and the cap. The ignition device with the inventive metal-sealing material-feedthrough can be utilized in gas generators, for example in hot gas generators, cold gas generators, hybrid generators.

As stated above, preferred areas of application are devices for pyrotechnic protective systems, for example airbags and belt tensioners.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 1a-1c show a method for the production of a ring-shaped or plate-like element according to the invention;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 2A:
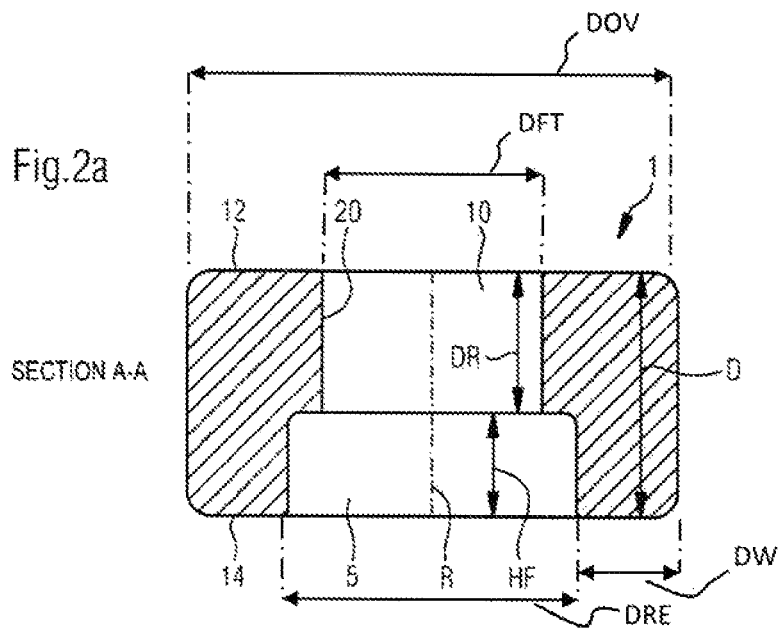
FIGS. 2a-2c show a ring-shaped or plate-like element according to the invention.

FIG. 1a illustrates the various stations of the production process. In the first station a blank 1010 is separated or respectively cut from a wire like material 1000. In the second step, that is in the second station to which the severed blank is transported in one production step, the blank is cold-formed by compressing to the point where the outside dimensions conform to the outside dimensions which the ring-shaped or plate-like element that is to be manufactured must have. The relative geometric dimensions are hereby altered, whereby the blank predominantly becomes wider due to compressing. In the following third station the cold-formed plate-like element 1020 is pressed against a punch 1040 with pressure 1030. Due to the pressure with which the ring-shaped or plate-like element is pressed against the punch, the material of the ring-shaped r plate-like element surrounds the punch. The material in the region of the punch is thereby removed from the plate-like element and the plate-like element with a relief opening or respectively relief region 1050 shown in the fourth station remains. The description of the sequence of process steps is merely exemplary. A relief opening in the blank could also be produced first, followed by subsequent reshaping.

Due to the relief bore thickness D of the plate-like element has been greatly reduced in region 1060 of the ring-shaped or plate-like element—that is to a thickness DR. The thickness of the ring-shaped or plate-like element is hereby reduced by between 20% and 60%, especially between 30% and 50%. Then, in a fifth process step a punching tool 1060 is inserted into the relief opening and a conical feedthrough opening 1070 is punched through the ring-shaped or plate-like element. Essentially, the ring-shaped or plate-like element with relief opening and feedthrough opening results as demonstrated in the fifth station. The inventive method distinguishes itself in that for each of the cited stations, that is for severing from the wire-like base material, forming, provision of the relief opening or respectively the relief region and punching of the feedthrough opening through the plate-like element with reduced thickness, essentially the same time is taken for each process step. This allows for the inventive method to be highly automated.

FIGS. 1b and 1c illustrate two methods which are possible in principle for providing the relief region or respectively the relief bore. In FIG. 1b, as in FIG. 1a the ring-shaped or plate-like element 1020 is pressed against a punch 1040 in the third step, so that the material surrounds the punch and from this a relief opening results. Alternatively it is possible, as shown in FIG. 1c, that not the plate-like base body 1020 is pressed against a punch 1040, but vice versa, punch 1040 is pressed against the ring-shaped or plate-like base body 1020. Then, due to the pressure on the side of the ring-shaped or plate-like body opposite the punch, the material is expelled. The result again is the ring-shaped or plate-like element with relief region or respectively relief bore.

Figure 2B:
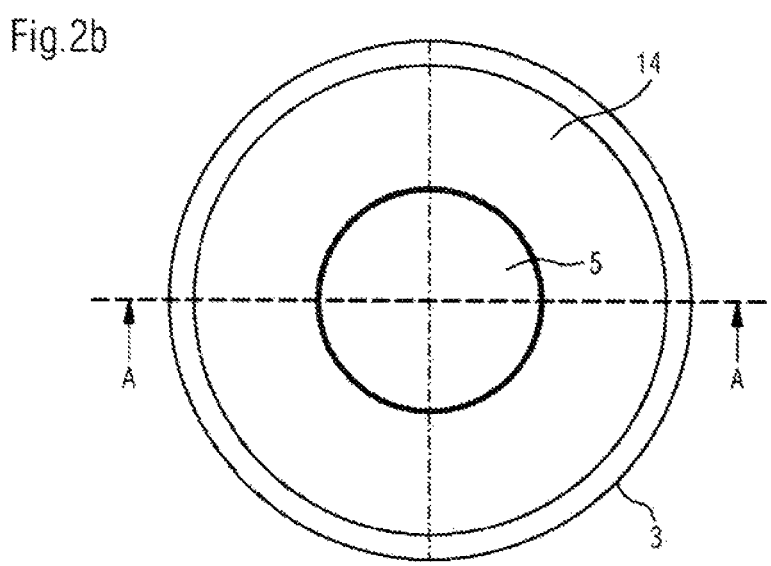
Figure 2C:
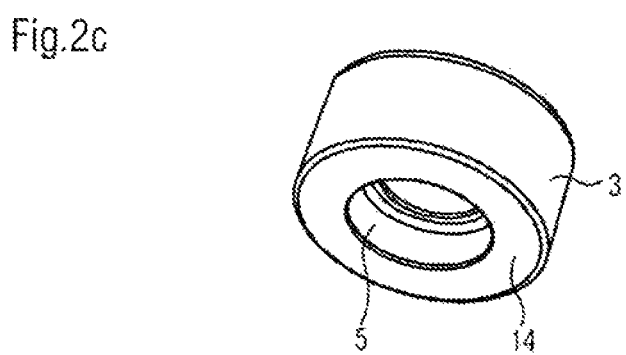

FIGS. 2a-2c illustrate a ring-shaped or plate-like formation or element, produced according to the inventive method which essentially is utilized as the base body for a metal-sealing material-feedthrough. As shown in a top view in FIG. 2b, the ring-shaped or plate-like element 1 has essentially a circular outer contour 3. Plate-like body 1 is produced preferably by a cold-forming process, as shown in FIG. 1a, for example from a wire. Hereby, a piece is first cut from the wire and is subsequently transformed through cold-forming, in particular through compression into the circular form illustrated in FIG. 2b in a top view from backside 14. FIG. 2c is an exploded view from backside 14.

Following this, a relief region 5 which is also referred to as relief bore is provided into the cold-formed component 1 by means of a punch.

The height or respectively thickness of the relief bore, which essentially circular as shown in the top view in FIG. 2b, equals HF. The relief bore or relief region represents a recess from one side of the ring-shaped or plate-like element. This recess is surrounded by a wall having a local thickness or length DW of its top area. As described, the relief region can be located in the center of the ring-shaped or plate-like element. In this case DW has substantially the same value within said ring-shaped or plate-like element.

The thickness of the entire ring-shaped or plate-like element which is obtained through cold-forming, equals D. The material therefore is weakened in the areas where the feedthrough opening is essentially placed central relative to the rotational axis R of the plate-like body, so that the solid material through which feedthrough opening 10 in the ring-shaped or plate-like element 1 must be punched equals merely DR. Thickness D of the plate-like element varies for example between 3.5 mm to 6 mm and thickness DR of the region to be punched out between 1.5 mm and 3 mm. As can be seen from FIG. 2a the diameter of the relief region is denoted with DRE. The relief region has a circular contour. The diameter of the circular feedthrough opening is denoted with DFT. The overall diameter of the ring-shaped or plate-like element is denoted with DOV. The length or thickness of area outside the relief region is denoted with DW. As described above, this area can be used to connect other functional components such as metal pins to the ring-shaped or plate-like element. According to the invention, the aforementioned design rules are fulfilled. The diameter of the relief region DRE is determined as difference between DOV and the required value for DW. As described, DW is for example a least 1.5 times the diameter of a metal pin to be connected to the ring-shaped or plate-like element in this area. This leads to the advantageous values for DRE to be between 1.1 to 5 times, for example 1.1 times to 2 times greater than the diameter DFT of the feedthrough opening. This also means the following relations are fulfilled:

$$DR \leq 1.5 \times DFT \text{ and}$$

$$DRE > DFT$$

If for example the diameter DFT of the feedthrough opening is 2 mm and the overall diameter DOV is 7 mm, then the diameter of the relief region is for example 4 mm, which is 2 times more than the diameter of the feedthrough opening. If the plate-like element 1 is utilized in a metal-sealing material-feedthrough, then a metal pin in a sealing material, for example in a glass plug is inserted in the feedthrough opening. The glass plug is then in contact with the walls of the feedthrough opening. In order to avoid pushing the metal pin which was encased in a glass plug out of feedthrough opening 10, even at high pressures means are provided to prevent a relative movement from the front side 12 of ring-shaped or plate-like element 1 to the rear side 14. In the present design example this is achieved in that the feedthrough opening tapers conically over at least one region 20.

Figure 3A:
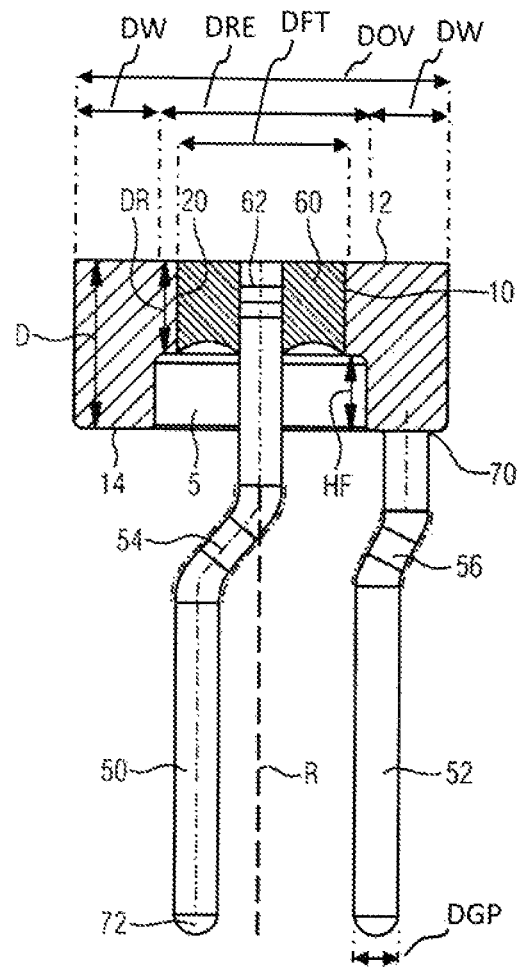
FIGS. 3a-3c show a metal-sealing material-feedthrough according to the invention.
Figure 3B:
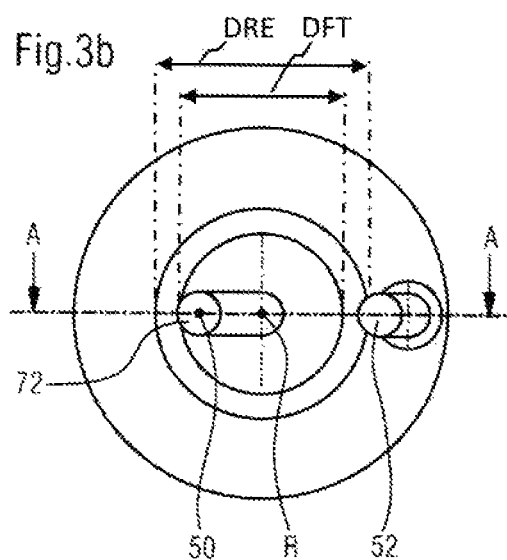
Figure 3C:
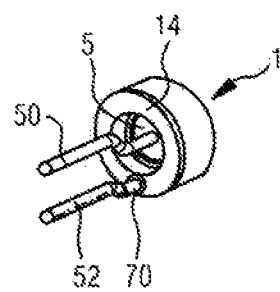

FIGS. 3a through 3c illustrate utilization of a plate-like element according to FIGS. 2a-2c according to the invention in a metal-sealing material-feedthrough, especially for airbag ignition devices, belt tensioning devices. Hereby FIG. 3a illustrates a section according to FIG. 2a, FIG. 3b a top view according to FIG. 2b and FIG. 3c an exploded view according to FIG. 2c.

Identical components as shown in FIGS. 2a through 2c carry the same identification numbers.

Ring-shaped or plate-like element 1 with a thickness D is clearly recognizable. Moreover, relief bore 5 with the diameter DRE is recognizable, which is punched out of the cold-formed plate-like element 1 by means of a punch. Above the punch, feedthrough opening 10 with the diameter DFT and its conical progression 20 which is punched from the remaining material with thickness DR can be seen. The diameter DRE of the relief region is always greater than the diameter DFT of the feedthrough opening, for example 1.1 to 5 times greater than the diameter DFT of the feedthrough opening.

The ring-shaped or plate-like element serves as the basis for a metal-sealing material-feedthrough with a total of two metal pins 50, 52. The diameter of pin 52 is denoted with DGP. The diameters of both pins 50 and 51 can be the same. While metal pin 50 is fed through the ring-shaped or plate-like base body 1 from the front side to the rear side, insulated in a sealing material 60—in this case a glass material which however can also be glass ceramics or ceramic materials—second metal pin 52 serves as ground pin. For this purpose, second metal pin 52 is connected directly with ring-shaped or plate-like body 1. Usually a solder or welding connection are used. Metal pin 50 as well as metal pin 52 is curved. The curvature of both metal pins is identified with 54 and 56 respectively and is clearly recognizable.

Metal pin 50 is moreover provided with means 62 on metal pin 50 itself, which engage into the glass plug thereby preventing the metal pin being pushed out of glass plug 60 into which the metal pin is glazed, even at high pressures.

Glazing of metal pin 50 into sealing material 10 occurs through sealing in. As soon as the metal pin is fused into the sealing material the glass plug is inserted into the feedthrough opening 10 together with the metal pin. Then, the glass plug, together with the ring-shaped or plate-like element, that is the base body, is heated so that after cooling the metal of the ring-shaped or plate-like element shrinks onto the sealing material, in this case the glass material, as previously in the production of the glass plug whereby the metal pin is inserted into the glass plug. The grounded metal pin 52 is connected conductively with the ring-shaped or plate-like element, for example through brazing. The welding location is identified with 70. Examples of values for a said ring-shaped and plate-like element according to the invention are an overall diameter DOV of 7 mm and an entire thickness D of 4.4 mm. The metal pins have a diameter DGP of 1 mm. DW can be calculated to be at least 1.5 mm by applying the aforesaid design rules. The diameter DFT of the feedthrough opening could be 2 mm in order to secure a reliable glazing. The feedthrough opening is stamped through the base body, therefore applying the aforesaid design rules requires that the length or thickness DR of the feedthrough opening is at maximum DR=1.5× DFT=3 mm. Those numbers are used to determine the diameter DRE of the relief region to be DRE=7 mm−2×1.5 mm=4 mm. Thereby the diameter DRE of the relief region is greater than the diameter DFT of the feedthrough opening. In this case 2 times greater. The height HF of the relief region is HF=D−DR=4.4 mm−3 mm=1.4 mm. Of course those are example values. The person skilled in the art is able to apply the described design rules in order to apply those to other dimensions, which are also covered by the inventions.

FIG. 3b is a top view of an inventive metal-sealing material-feedthrough. Clearly seen in the top view is the central feedthrough 10 in the ring-shaped or plate-like element 1. Moreover, curved metal pin 50 and 52 respectively is clearly recognizable. Especially on metal pin 50 it can be clearly seen that the metal pin is offset, that is bent at its end 72 relative to center R of the plate-like base body. This also applies to metal pin 52. The curved pins are also clearly visible in the view in FIG. 3c. The illustration in FIG. 3c of the entire metal-sealing material-feedthrough shows in particular also the welding region 70 of the grounded pin as well as the relief bore or respectively the relief region 5 in the ring-shaped or plate-like base body. The diameter in the relief region is denoted with DRE, the diameter of the feedthrough opening with DFT. It is characteristic for a metal-sealing material-feedthrough with a plate-like element as base body according to the invention which has a relief bore or respectively a relief region that the embedding in glass 20 of the metal pin in the base body occurs only over a partial region, namely only over the thickness DR of the feedthrough opening and not over the entire thickness D of the base body.

Figure 4A:
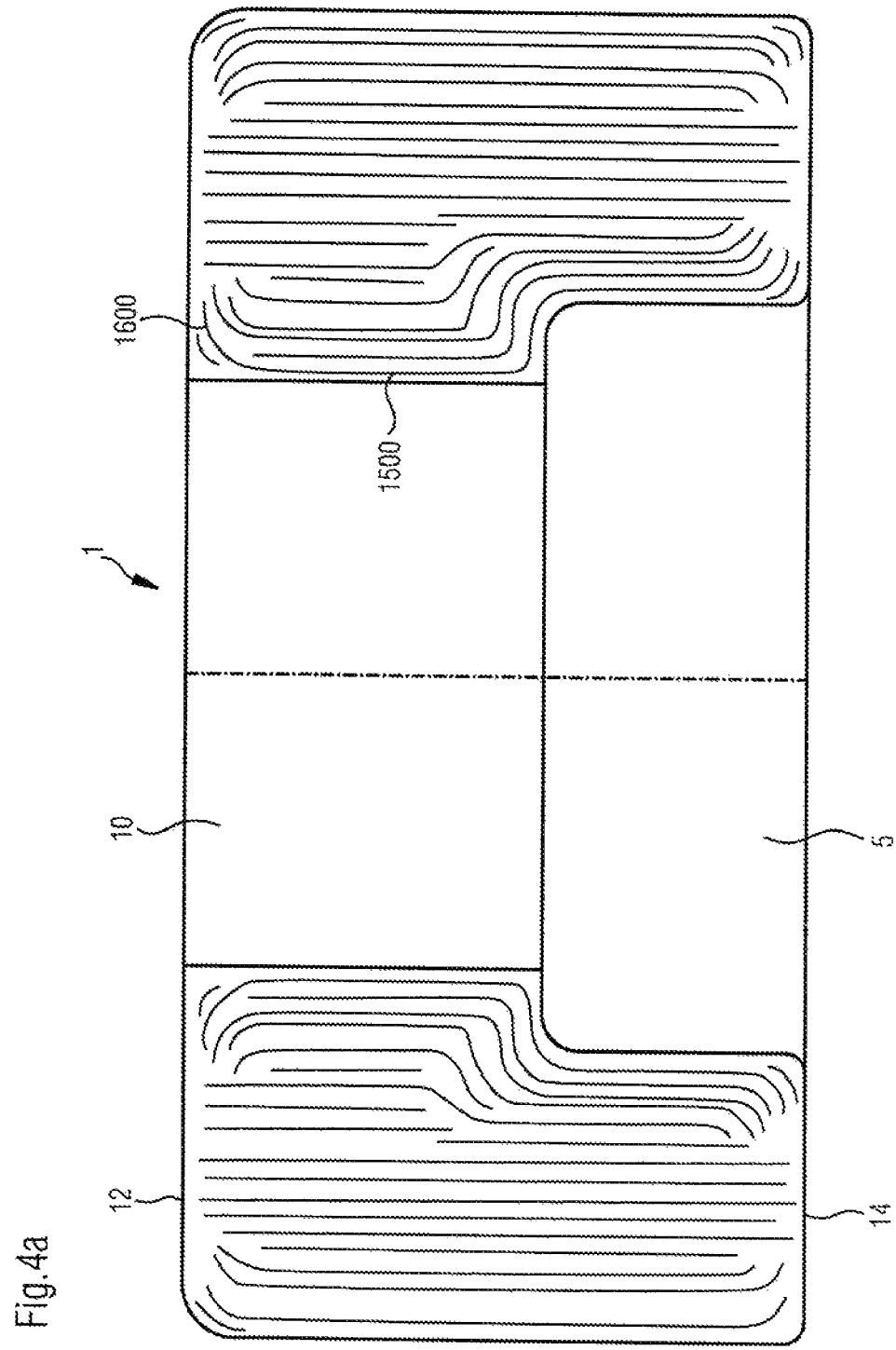
FIGS. 4a-4b show a comparison of the phase lines in a metallurgical section of a ring-shaped or a plate-like body according to the current state of the art.

FIG. 4a is a metallurgical section through a ring-shaped or plate-like element 1 produced through the inventive forming and punching process, as illustrated in FIG. 2a.

Identical components as shown in FIG. 2a carry the same identification numbers.

As can be seen from the metallurgic section according to FIG. 4a, the ring-shaped or plate-like elements 1 produced according to the inventive method are identified through structure-/flow-lines 1500 which were bent in region 1600 due to the forming process.

Figure 4B:
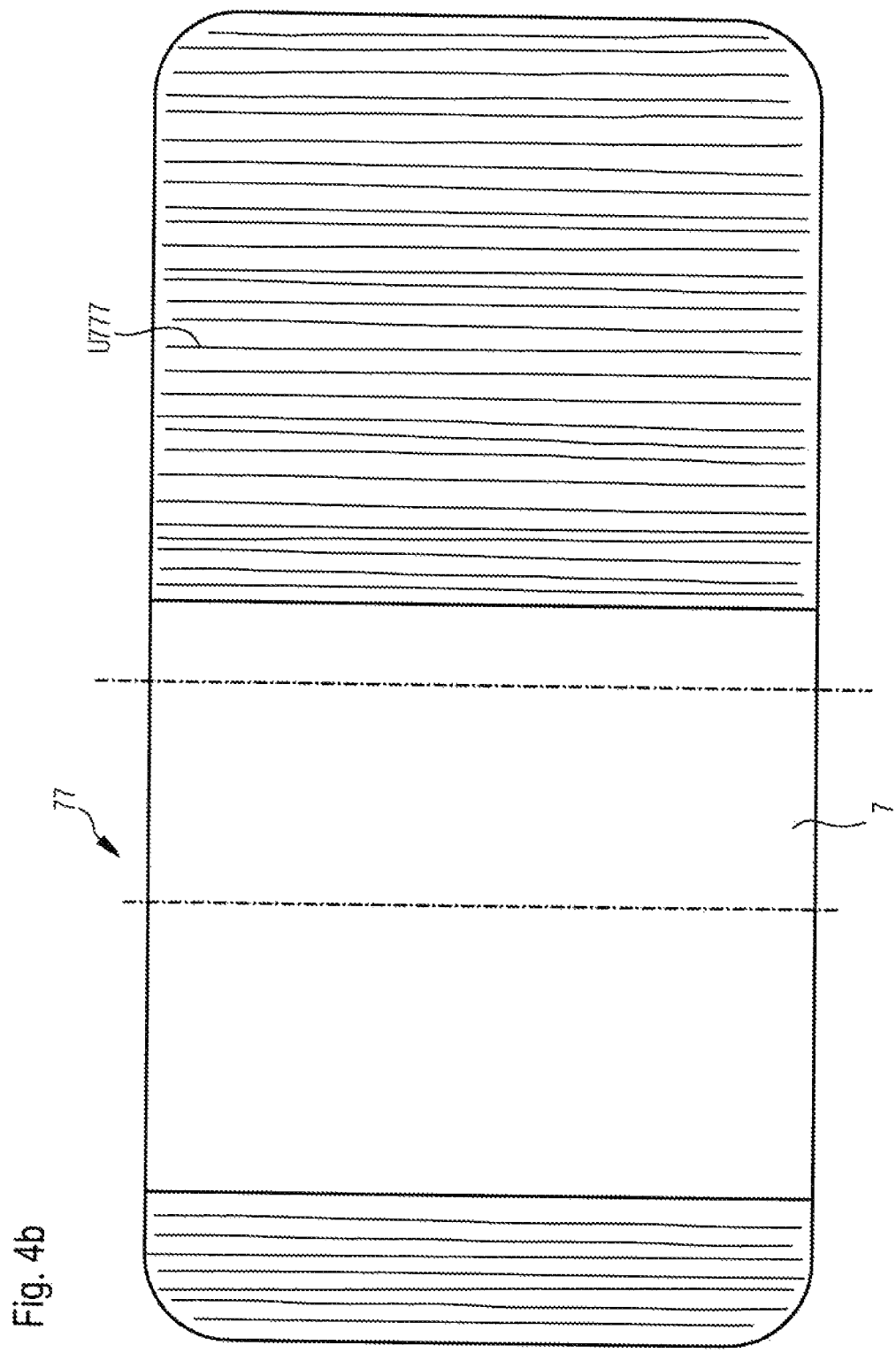

In contrast to this, FIG. 4b illustrates a component 100 produced in accordance with the conventional method by means of machining, which is in particular a turned part. Shown again are the structure-/flow lines 2000. Structure-/flow lines 2000 are essentially parallel and point into the same direction as the bar stock from which the ring-shaped or respectively plate-like component 100 was produced according to the state of the art, as shown in FIG. 4b. Feedthrough opening 110 is bored out of component 100.

The invention cites a method for the first time with which a plate-like element is to be produced in a simple manner and distinguishes itself through compatibility with the metal-sealing material-feedthrough according to the state of the art, thus enabling installation in conventional ignition devices or respectively airbags.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for producing a ring-shaped or plate-like element for a metal-sealing material-feedthrough for a plurality of devices which are subjected to high pressures, said method comprising the steps of:
   providing a blank; and
   subjecting said blank to a processing so that a feedthrough opening with a diameter DFT can be incorporated into said element created from said blank, wherein said processing of said blank includes incorporation of a relief region with a diameter DRE, said diameter DRE being greater than the diameter DFT of the feedthrough opening, wherein said blank is formed from a wire-shaped material and said processing of said blank includes a cold-forming process.

2. The method according to claim 1, wherein the diameter of the relief region DRE is 1.1 to 5 times greater than the diameter of the feedthrough opening DFT.

3. The method according to claim 1, wherein the diameter of the relief region DRE is 1.1 to 2 times greater than the diameter of the feedthrough opening DFT.

4. The method according to claim 1, wherein the relief region is located in the center of the element and the diameter of the relief region DRE is calculated by DRE=DOV−2×DW, wherein DOV is the overall diameter of the element and DW is the length or thickness of the wall surrounding the relief region.

5. The method according to claim 1, wherein the feedthrough opening is punched through said element and the thickness DR of the feedthrough opening is at maximum 1.5 times greater than the diameter DFT of the feedthrough opening.

6. The method according to claim 1, wherein said plurality of devices includes at least one of an igniter for an airbag and a belt tensioning device.

7. The method according to claim 1, wherein said cold-forming process includes compression.

8. The method according to claim 1, wherein said element has an essentially round outside contour and said feedthrough opening is located in a center.

9. The method according to claim 1, wherein, after producing said relief region, a punching tool having a diameter corresponding to the diameter of the feedthrough opening DFT which is smaller than the diameter of the relief region DRE is provided in an area associated with said relief region in order to punch out said feedthrough opening.

10. The method according to claim 9, wherein said punching tool is a stance needle.

11. The method according to claim 9, wherein cold forming said element from said blank occurs in a first amount of time, providing said relief region occurs in a second amount of time, and punching said feedthrough opening into said element occurs in a third amount of time, wherein the first amount of time, the second amount of time, and the third amount of time are essentially the same.

12. The method according to claim 1, wherein the produced element includes bent flow lines adjacent to the relief region.

13. A method for producing a ring-shaped or plate-like element for a metal sealing material-feedthrough for a plurality of devices which are subjected to high pressures, the method comprising the steps of:
providing a wire-shaped material as a blank;
cold-forming the blank, whereby relatively geometric dimensions of the blank are changed, resulting in the ring-shaped or plate-like element; and
subjecting said element to a processing so that a feedthrough opening with a diameter DFT is incorporated into said element created from said blank, wherein said processing of said element includes incorporation of a relief region with a diameter DRE, said diameter DRE being greater than the diameter DFT of the feedthrough opening.

14. The method according to claim 13, wherein, to incorporate the relief region, said blank or said element is pressed against a punch and a material of said blank or said element flows around said punch.

15. The method according to claim 14, wherein, after producing said relief region, a punching tool having a diameter corresponding to the diameter of the feedthrough opening DFT which is smaller than the diameter of the relief region DRE is provided in an area associated with said relief region in order to punch out said feedthrough opening.

16. The method according to claim 15, wherein said punching tool is a stance needle.

17. The method according to claim 15, wherein cold forming said element from said blank occurs in a first amount of time, providing said relief region occurs in a second amount of time, and punching said feedthrough opening into said element occurs in a third amount of time, wherein the first amount of time, the second amount of time, and the third amount of time are essentially the same.

* * * * *